US009105195B2

(12) United States Patent
Savage

(10) Patent No.: US 9,105,195 B2
(45) Date of Patent: Aug. 11, 2015

(54) METHOD AND MATERIALS FOR TRAINING EMERGENCY FIRST RESPONDERS

(71) Applicant: Olfactix, LLC, Williams, AZ (US)

(72) Inventor: Eric R. Savage, Williams, AZ (US)

(73) Assignee: Olfactix, LLC, Williams, AZ (US)

( * ) Notice: Subject to any disclaimer, the term of this patent is extended or adjusted under 35 U.S.C. 154(b) by 0 days.

(21) Appl. No.: 13/653,459

(22) Filed: Oct. 17, 2012

(65) Prior Publication Data

US 2013/0095456 A1    Apr. 18, 2013

Related U.S. Application Data

(60) Provisional application No. 61/548,393, filed on Oct. 18, 2011.

(51) Int. Cl.
*G09B 9/00* (2006.01)
*G09B 19/00* (2006.01)

(52) U.S. Cl.
CPC  *G09B 9/003* (2013.01); *G09B 9/00* (2013.01); *G09B 9/006* (2013.01); *G09B 19/00* (2013.01)

(58) Field of Classification Search
CPC ........... G09B 9/00; G09B 9/003; G09B 19/00
USPC ......................................... 434/219, 236, 262
See application file for complete search history.

(56) References Cited

U.S. PATENT DOCUMENTS

| 4,353,301 A | * | 10/1982 | Jacobsen ....................... 102/334 |
| 2010/0301132 A1 | * | 12/2010 | Wagstaff-Bellomo et al. . 239/36 |
| 2011/0140407 A1 | * | 6/2011 | Klein ............................. 281/31 |
| 2013/0084535 A1 | * | 4/2013 | Braun et al. ................. 431/288 |

FOREIGN PATENT DOCUMENTS

EP           123746 A2 * 11/1984

OTHER PUBLICATIONS

"Infantry Immersion Trainer," http://www.onr.navy.mil/Media-Center/Press-Releases/2008/Demonstrates-Revolutionary-Infantry-Immersion.aspx, 2008.*
"Waxed Cardboard Waiver Form," Massachusetts Department of Environmental Protection, Jul. 2007.*
"Cranking Up Urban Training," http://www.fortcampbellcourier.com/news/article_25187161-1c39-59ff-bc30-d4f787af79dd.html, May 3, 2007.*

(Continued)

*Primary Examiner* — Sam Yao
*Assistant Examiner* — Jennifer L Fassett
(74) *Attorney, Agent, or Firm* — Woods Oviatt Gilman LLP; Ronald J. Kisicki, Esq.

(57) ABSTRACT

An olfactory training device and method replicating one or more aromas typical of any man-caused or natural incident or accident, especially such aromas accompanied by or originating in open, smoldering, or smoking fire. Such aromas may originate from burning tissue, bones, cartilage, or other bodily materials. Such burning aromas may also originate from other synthetic or natural materials. One or more such olfactory training devices may be dispersed in a manner to engage the olfactory-sensory system of a trainee. The olfactory training device may be classroom-deployed, field-deployed, laboratory-deployed, or deployed via any type of setting-deployable training device or protocol.

8 Claims, 2 Drawing Sheets

(56) References Cited

OTHER PUBLICATIONS

"Cedar Bay Grilling Company," http://cedarbaygrilling.com/cedar-planked-atlantic-salmon-wins-healthy-innovation-award/ and https://www.flickr.com/photos/anotherpintplease/9165352853/sizes/l/in/photostream/ and http://cedarbaygrilling.com/cedar-planked-salmon/, Jul. 14, 2010.*

"Prediction of Quality in Frozen Cod," LeBlanc et al., http://onlinelibrary.wiley.com/doi/10.1111/j.1365-2621.1988.tb07700.x/pdf, Journal of Food Science, vol. 53, No. 2, 1988, p. 329.*

"What Does Burning Human Flesh Smell Like?" M. Tsai, http://www.slate.com/articles/news_and_politics/explainer/2007/03/barbyou.html, Mar. 26, 2007.*

"Supermarket Steaks vs. Ye Olde Butcher Shoppe," D. Ross, http://forums.egullet.org/topic/104855-supermarket-steaks-vs-ye-olde-butcher-shoppe/page-2, Jul. 21, 2007.*

"How to Wrap Meat Like a Pro," tipnut.com, http://web.archive.org/web/20080902051708/http://tipnut.com/how-to-wrap-meat/, Sep. 2, 2008.*

* cited by examiner

METHOD AND MATERIALS FOR TRAINING EMERGENCY FIRST RESPONDERS

This Application claims the benefit of U.S. Provisional Application No. 61/548,393, filed Oct. 18, 2011 which is incorporated herein in its entirety.

TECHNICAL FIELD

The present invention relates to persons responding to emergency situations; more particularly, to first responders exposed to repulsive aromas on the job for the first time; and most particularly, to method and materials for training first responders to experience, recognize, and withstand such aromas in a non-emergency training environment in order to condition the first responders for experiences of real-world situations.

BACKGROUND OF THE INVENTION

In the prior art, emergency personnel are required as a standard part of their duties to arrive and lend assistance at scenes of disaster typically involving serious injury and loss of human life. Such assistance may include searching for survivors, identifying levels of injury, removing bodies and human parts from the wreckage, and investigating the cause of a disaster. It is often critical for such assistance to be administered within a short time frame after the disaster has occurred, when the disaster scenes are the most horrific.

It is known in the art that some personnel, and especially new and inexperienced workers (also referred to herein as "rookies"), are so aghast and sickened by what they find that they cannot function nor properly perform their duties. A particularly difficult obstacle is the smell of burned human flesh, which a rookie-first responder may never have encountered before. Other odors or aromas may also be nauseating and incapacitating.

What is needed in the art is a device that can closely simulate the odors often encountered in disaster situations and a method using such a device for training first responders to experience, recognize, and withstand such aromas in a non-emergency training environment before they are exposed to actual disaster scenes.

It is a principal object of the present invention to prepare human responders for experiencing nauseating aromas in their subsequent work environment.

SUMMARY OF THE INVENTION

Briefly described, an olfactory training device in accordance with the present invention replicates aromas typical of any man-caused or natural incident or accident, especially such aromas accompanied by or originating in open, smoldering, or smoking fire that may be present an aircraft accident site. Such aromas may originate from burning of human tissue, bones, cartilage, blood or other bodily materials. Such burning aromas may also originate from other synthetic or natural materials.

In a method in accordance with the present invention, one or more such olfactory training devices is dispersed in a manner to engage the olfactory-sensory system of a trainee. The olfactory training device may be classroom-deployed, field-deployed, laboratory-deployed, or deployed via any type of setting-deployable training device or protocol.

BRIEF DESCRIPTION OF THE DRAWINGS

The above-mentioned and other features are advantages of this invention, and the manner of attaining them, will become apparent and be better understood by reference to the following description of the invention in conjunction with the accompanying drawings, wherein.

DESCRIPTION OF THE PREFERRED EMBODIMENTS

Figure 1:
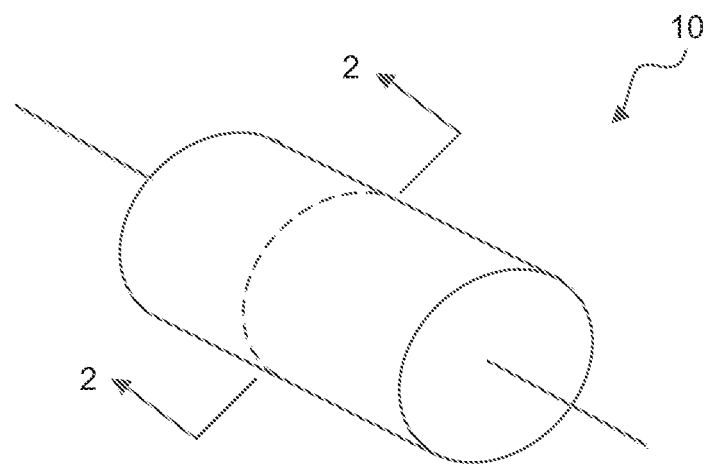
FIG. 1 is an isometric view of the olfactory training device in accordance with the invention.

It is well known that, in training first responders, it is most beneficial to expose trainees to a real-world disaster environment in order to condition the trainees for the many situations that could be encountered. In the prior art of first-responder training, it is known to initially expose trainees to visual static and dynamic displays of an actual accident scene (including the human fatalities) in a classroom via a computer and overhead aids. Both visual and audio cues of an accident scene may be simulated in this manner. Later in the program, as training progresses, the trainees may be exposed to a simulated aircraft disaster site in the field, where a full-scale aircraft is used and volunteers are made up to appear as accident victims having a variety of injuries for Triage training. Thus, at this point, mostly visual cues, and a few audio cues from "groaning victims", are used for training purposes. At a further stage in the program, a mass-casualty disaster site may be simulated with a greater number of injured victim-actors, including a greater number of simulated human casualties. The mass-casualty disaster site may also include full-scale aircraft and may add the burning of surrounding brush and earth to further simulate a crash scene. The isolated fires provide an opportunity to the first responders to additionally learn how to control and extinguish the fires that may occur at an accident scene.

Heretofore, only the sights and sounds of an actual aircraft disaster have been used to train first responders. First responders have never been provided with a device or a training method that would condition them to recognize and deal with the horrific odors present at an aircraft disaster site in a simulated training setting. An olfactory training device that may be used in accordance with the present invention replicates aromas typical of any man-caused or natural incident or accident, especially such aromas accompanied by or originating in the open, smoldering, or smoking fires associated with a disaster scene.

The replicated aromas may originate from burning tissue, bones, cartilage, ligaments, muscles, natural and artificial fibers, body fluids, body waste, and associated remains of animals, including but not limited to animals, vertebrate and invertebrate species, plants, flowers, bacteria, fungi, mites, or insects.

The replicated aromas may be combined with other aromas typically encountered at a disaster scene including, for example, burning rubber and rubber-based products or compounds; petroleum and petroleum-based products or compounds; plastic or plastic-based products or compounds; any synthetic or natural materials such as wood and wood-based products; and metal and metal-based products involved in a fire or reaching associated flash points, fire points, or auto-ignition of all such materials, products, compounds, fluids, waste, remains, bones, cartilage, ligaments or tissue.

In a method in accordance with the present invention, one or more such olfactory training devices is prepared in a form suitable for aromatic distribution and then is dispersed, engaged, enacted, released, or aerated via burning, spraying in liquid form, aerating in liquid form, aerating in powder form, scratching in solid- or powder-form, rubbing in solid- or powder-form, tasting in any form, or otherwise engaging the olfactory-sensory system.

Figure 2:
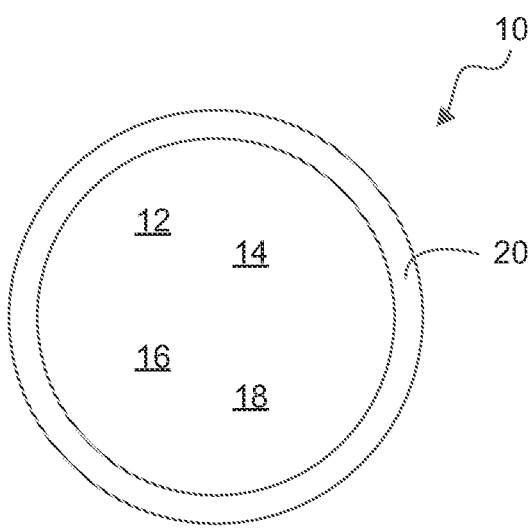
FIG. 2 is a cross-sectioned view of the olfactory training device, in accordance with the invention, taken along line 2-2 in FIG. 1.

Referring to FIGS. 1 and 2, in one aspect of the invention, the device 10 may be a compaction comprised of a collection 12 of one or more compacted wood-products, wood bi-products, wood biomass, wood, wood shavings, metal-products, metal-based products, metal shavings, common paraffin series (linear-, branched, cyclo-alkanes), crumb rubber, rubber-based products, rubber, and the following 14 from mammals, reptiles, amphibians, vertebrates, invertebrates: hair, keratin and unguis, bones, blood, feces, urine; and other elements 16 such as lubricating, cooking, and cosmetic oils, plastic-based products, plastic products, plastic shavings, artificial or synthetic oils, waxes, and compounds, plant or plant-based products, flower or flower-based products, dirt or geo-based products, water or water-based products. The device may be formed into any shape with any dimensions. For example, as shown in FIG. 1, the device may be formed generally into a cylinder. The device may also be formed into the shape of a cube, an elongated cube (rectangle) or any other geometric shape. The cylinder may be approximately one to thirty-six inches in diameter and one to thirty-six inches long. Included in the compaction may be a combustible 18 such as, for example, common paraffin series (linear-, branched-, cyclo-alkanes) or kerosene to encourage smoldering of the device once ignited. The device may also be encapsulated in an outer coating or skin 20 to promote shelf life, ease of handling and ignition of the compaction. The outer coating may be, for example, paper or cardboard, cloth, wax or plastic.

The olfactory training device may produce aromas including one or more of the following: melting or burning metal, petroleum-based liquids and solids, synthetic- and natural-fabric materials and liquids, rubber and rubber-based products, hair, bone, feces, urine, blood, fluids, and tissue.

Figure 3:
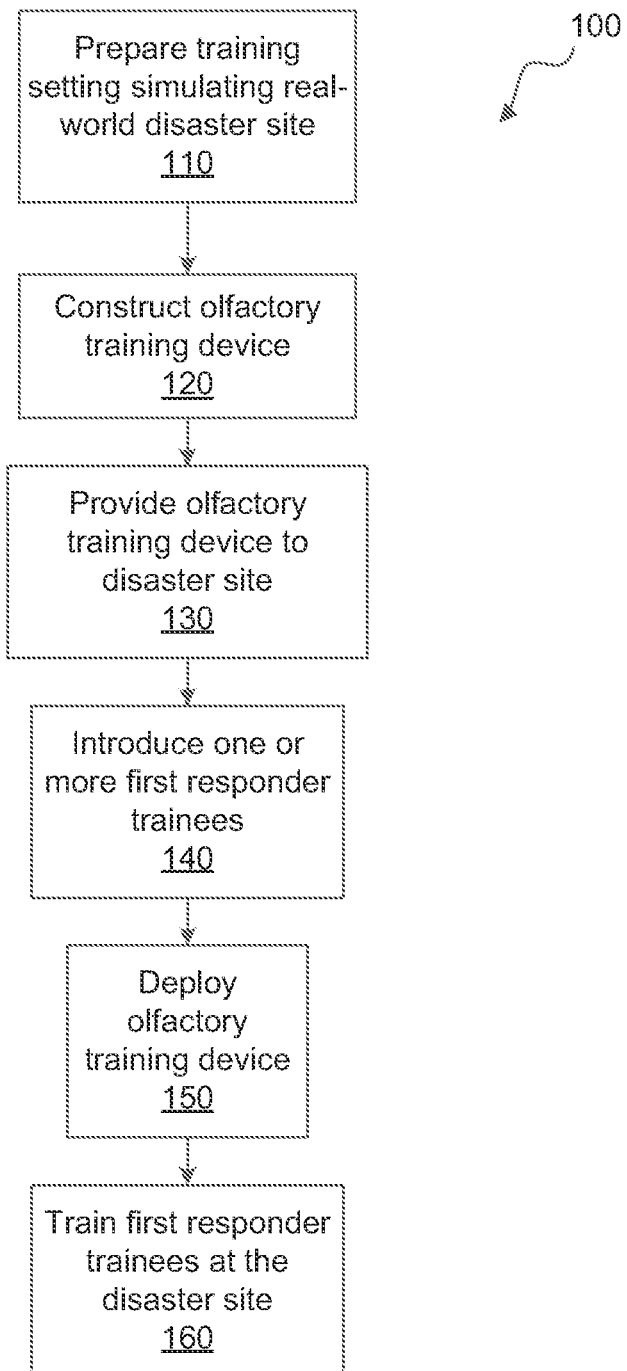
FIG. 3 shows a method of employing an olfactory training device in accordance with the invention.

In a method 100 of training first responders in accordance with the present invention, an olfactory training device may be aromatically deployed in a classroom, the field, a laboratory or in any other type of setting is shown in FIG. 3. In one aspect of the invention, the method of training first responders to perform at a real-world disaster site includes the steps of:
  a) preparing a training setting to visually simulate a real-world disaster site (step 110);
  b) constructing an olfactory training device that, when aromatically deployed, simulates the aromas of a real-world disaster site (step 120);
  c) providing to the simulated real-world disaster site said olfactory training device capable of aromatic deployment (step 130);
  d) introducing one or more first responder trainees to the simulated disaster site (step 140);
  e) aromatically deploying said olfactory training device in the presence of the one or more first responder trainees (step 150); and
  f) training said one or more first responder trainees to perform at a real-world disaster site through exposure to said simulated aromas (step 160).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for presenting at least one olfactory training device to engage an olfactory-sensory system of a trainee to simulate the odors of a burning body encountered in disaster situations, comprising the steps of:
  a) selecting from mammals, reptiles, amphibians, vertebrates, or invertebrates one or more bioorganic materials comprising animal flesh, animal bones, or animal blood and further comprising one or more bioorganic materials selected from the list consisting of: animal urine, animal feces, animal hair, and animal keratin and unguis;
  b) forming from said selected bioorganic materials a unitized compaction of said bioorganic materials;
  c) encapsulating said unitized compaction of said bioorganic materials by coating said compaction with a material selected from the group consisting of: paper, cardboard, cloth, wax, and plastic, wherein step c) occurs after step b);
  d) allowing for the ignition of said coating; and
  e) allowing for the combustion of said unitized compaction, wherein the combustion of said compaction simulates the odors of a burning body encountered in disaster situations.

2. The method in accordance with claim 1, wherein said compaction further comprises one or more building materials, wherein said one or more building materials is selected from the group consisting of: wood, wood-based products, metal, metal-based products, rubber, rubber-based products, petroleum, petroleum-based compounds, and petroleum-based products.

3. The method in accordance with claim 1, wherein said at least one olfactory training device further comprises one or more synthetic materials selected from the group consisting of: lubricating oil, cooking oil, cosmetic oil, synthetic wax, plastic, polymer-based compounds, and plastic-based products.

4. The method in accordance with claim 1, wherein said at least one olfactory training device further comprises a smoldering agent comprising one or more of a paraffin or kerosene.

5. The method in accordance with claim 1, wherein said allowing for the ignition of said coating and allowing for the combustion of said unitized compaction is carried out in an environment selected from the group consisting of: classroom, field, laboratory, and combinations thereof.

6. The method in accordance with claim 1, wherein said unitized compaction is formed in a shape of a cylinder.

7. A method of training a first responder by engaging an olfactory-sensory system of a trainee by simulating the odors of a burning body encountered in disaster situations, comprising the steps of:
  a) preparing a training setting to visually simulate a real-world disaster scene;
  b) providing an olfactory training device capable of aromatic deployment by first forming a unitized compaction comprising one or more bioorganic materials comprising animal flesh, animal bones, or animal blood and further comprising one or more bioorganic materials selected from the list consisting of: animal urine, animal feces, animal hair, and animal keratin and unguis and then subsequently encapsulating said unitized compaction by coating said compaction with a material selected from the group consisting of: paper, cardboard, cloth, wax and plastic;

c) introducing one or more trainees to the simulated disaster scene;
d) aromatically deploying said olfactory training device by igniting said coating and combusting said unitized compaction in the presence of the one or more trainees; and
e) training said one or more trainees to perform in the presence of said real-world disaster scene.

8. The method in accordance with claim 7, wherein the step of forming the unitized compaction further comprises forming the unitized compaction of one or more building materials, wherein said one or more building materials is selected from the group consisting of: wood, wood-based products, metal, metal-based products, rubber, rubber-based products, petroleum, petroleum-based compounds, and petroleum-based products.

* * * * *